United States Patent
Okita et al.

(10) Patent No.: US 12,280,447 B2
(45) Date of Patent: Apr. 22, 2025

(54) CRACK REPAIR METHOD FOR EXISTING STEEL STRUCTURE

(71) Applicant: IHI CORPORATION, Tokyo (JP)

(72) Inventors: Daiki Okita, Tokyo (JP); Naoyuki Matsumoto, Tokyo (JP); Koutarou Inose, Tokyo (JP)

(73) Assignee: IHI CORPORATION, Tokyo (JP)

( * ) Notice: Subject to any disclaimer, the term of this patent is extended or adjusted under 35 U.S.C. 154(b) by 735 days.

(21) Appl. No.: 17/463,858

(22) Filed: Sep. 1, 2021

(65) Prior Publication Data

US 2021/0402519 A1 Dec. 30, 2021

Related U.S. Application Data

(63) Continuation of application No. PCT/JP2020/012712, filed on Mar. 23, 2020.

(30) Foreign Application Priority Data

Mar. 29, 2019 (JP) .................................. 2019-068100

(51) Int. Cl.
*B23K 26/342* (2014.01)
*E01D 22/00* (2006.01)
*E04G 23/02* (2006.01)

(52) U.S. Cl.
CPC ............ *B23K 26/342* (2015.10); *E01D 22/00* (2013.01); *E04G 23/0203* (2013.01)

(58) Field of Classification Search
CPC .... B23K 26/342; B23K 9/04; B23K 26/0006; B23K 26/34; B23K 9/23; B23K 2103/04; E04G 23/0203; E01D 22/00; E01D 2101/30; B23P 6/04
See application file for complete search history.

(56) References Cited

U.S. PATENT DOCUMENTS

| 4,743,733 A | 5/1988 | Mehta et al. |
| 2002/0148817 A1 | 10/2002 | Tewari |
| 2010/0159265 A1* | 6/2010 | Fairchild ................. C22C 38/04 |
| | | 219/137 R |

(Continued)

FOREIGN PATENT DOCUMENTS

| JP | S61-091371 A | 5/1986 |
| JP | H101-091993 A | 4/1989 |
| JP | H04-075726 A | 3/1992 |

(Continued)

OTHER PUBLICATIONS

European Patent Office, "Extended European Search Report", issued in European Patent Application No. 20 783 146.2, which is a counterpart to U.S. Appl. No. 17/463,858, on Dec. 6, 2022, 6 pages.

*Primary Examiner* — Dana Ross
*Assistant Examiner* — Kuangyue Chen

(57) ABSTRACT

A crack repair method includes a build-up welding step of performing build-up welding on a portion of an existing steel structure where a crack is generated while feeding a filler wire, and a laser beam piercing welding step of performing piercing welding using a laser beam on a filler material build-up portion caused by the build-up welding in the build-up welding step and the crack. The crack can be melted and repaired without lowering a toughness value regardless of an operation condition.

2 Claims, 4 Drawing Sheets

(56) References Cited

U.S. PATENT DOCUMENTS

2011/0049112 A1\* 3/2011 Johnson ............... B23K 26/342
219/121.64

FOREIGN PATENT DOCUMENTS

| JP | H06-088120 A | 3/1994 |
|----|--------------|--------|
| JP | 2003-311463 A | 11/2003 |
| JP | 2004-148456 A | 5/2004 |
| JP | 4057833 B2 | 3/2008 |
| JP | 2013-086163 A | 5/2013 |
| JP | 2015-024440 A | 2/2015 |
| JP | 5860264 B2 | 2/2016 |
| JP | 2018-040211 A | 3/2018 |
| JP | 6384632 B1 | 9/2018 |

\* cited by examiner

CRACK REPAIR METHOD FOR EXISTING STEEL STRUCTURE

CROSS REFERENCE TO RELATED APPLICATIONS

This patent application is a continuation application of co-pending International Patent Application No. PCT/JP2020/012712 designating the United States of America and filed on Mar. 23, 2020, which claims the benefit of foreign priority to Japanese Patent Application No. 2019-068100 filed on Mar. 29, 2019, the contents of all of which applications are incorporated by reference herein in their entireties. The International Application was published in Japanese on Oct. 8, 2020, as International Publication No. WO 2020/203411 A1 under PCT Article 21(2).

TECHNICAL FIELD

Embodiments described herein relate to a crack repair method for an existing steel structure that is suitable for use in, for example, repairing a crack generated in an existing steel structure such as an existing bridge or an existing building of which main members are made of steel materials.

BACKGROUND ART

Conventionally, when a crack is generated in an existing structure such as a bridge or a building due to aging or metal fatigue, for example, a welding repair device using a laser beam that requires a small heat input amount has been adopted. In this welding repair device, laser welding is performed on a cracked portion to be repaired by welding to melt the portion and eliminate the crack (see Patent Document 1).

RELATED ART DOCUMENT

Patent Document

Patent Document 1: Japanese Patent No. 5860264

SUMMARY OF THE DISCLOSURE

Problems to be Solved by the Disclosure

However, it is known in the crack repair method using the laser welding described above that the toughness value of a welded portion decreases (according to special operation conditions) when an existing steel structure such as a bridge or a building is formed of, for example, an old structure steel material containing sulfur and phosphorus in addition to a large amount of carbon.

Therefore, there is a problem that it is difficult to use laser welding having a low heat input amount for crack repair performed on existing steel structures formed of old structure steel materials as described above and severely restricted in decrease of toughness value, and it has been a challenge in the conventional art to solve this problem.

The present disclosure has been made to solve the above-mentioned conventional problem. An object of the present disclosure is to provide a crack repair method for an existing steel structure that can melt and eliminate a crack generated in the existing steel structure by laser welding without reducing the toughness value, for example, even when the existing steel structure is formed of a structure steel material containing a large amount of carbon, sulfur, and phosphorus.

Means for Solving the Problems

A first aspect of the present disclosure is a crack repair method for repairing a crack generated in an existing steel structure by using a filler material, and includes a build-up welding step of performing build-up welding using the filler material on the crack generated in the existing steel structure, and a laser beam piercing welding step of performing laser beam piercing welding on a filler material build-up portion caused by the build-up welding in the build-up welding step and the crack.

In the crack repair method for an existing steel structure of the present disclosure, prior to the build-up welding step, component of the filler material and the additive amount of the filler material are first determined according to a toughness value expected for a welding-repaired portion after crack repair. The component and the additive amount of the filler material may be determined by utilizing past data stored in a database, or may be determined by adopting data obtained by tests each of which is performed every time a repair is performed.

Next, in the build-up welding step, the build-up welding is performed on the crack generated in the existing steel structure while adding the filler material of the component determined as described above by a predetermined amount.

After this build-up welding, in the laser beam piercing welding step, piercing welding having a low heat input amount is performed on the filler material build-up portion caused by the build-up welding in the previous build-up welding step and the crack by a laser beam. By performing the piercing welding having a low heat input as described above, the crack can be melted and eliminated without lowering the toughness value even when the structure steel material constituting the existing steel structure contains a large amount of carbon, sulfur, and phosphorus.

In other words, it is possible to eliminate a crack without lowering the toughness value even under an operation condition that may cause a decrease in toughness value, such as repairing a crack in an existing steel structure formed of an old structure steel material.

Effects of the Disclosure

The crack repair method for an existing steel structure according to the present disclosure brings a very excellent effect that a crack generated in an existing steel structure can be melted and eliminated by laser welding without lowering the toughness value even under an operation condition that may cause a decrease in the toughness value.

MODE FOR CARRYING OUT THE DISCLOSURE

Hereinafter, embodiments of the present disclosure will be described with reference to the drawings.

Figure 1:
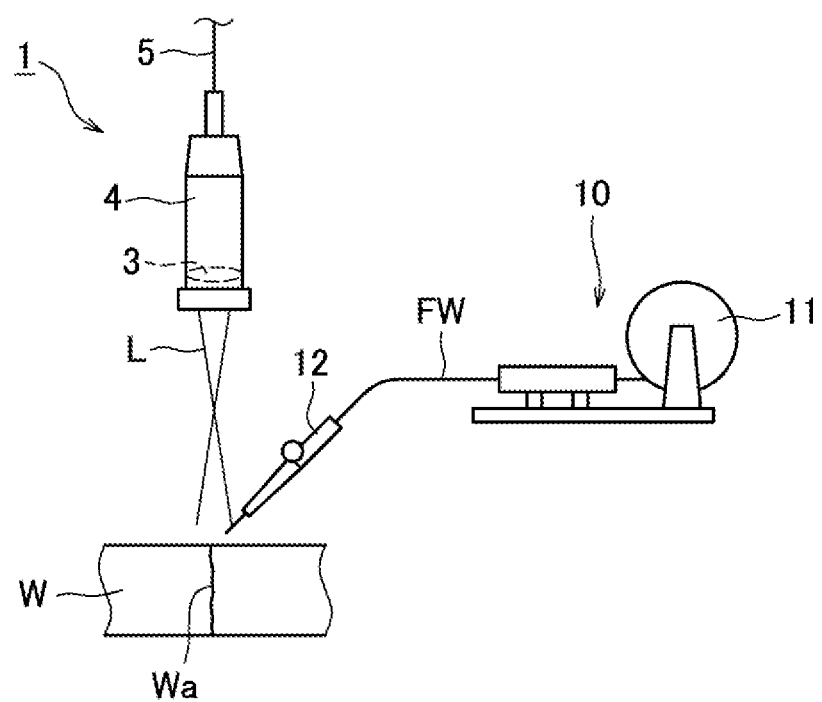
FIG. 1 is a schematic diagram schematically showing a laser welding device for use in a crack repair method for an existing steel structure according to an embodiment of the present disclosure.

FIG. 1 shows a laser welding device for use in a crack repair method for an existing steel structure according to an embodiment of the present disclosure.

As schematically shown in FIG. 1, the laser welding device 1 welds and repairs a crack Wa generated in a structure steel material W constituting an existing steel structure, for example, a web plate of an I-beam to be used for a main girder of a bridge. The laser welding device 1 includes a laser head 4 having a built-in optical system 3 for focusing a laser beam L which is supplied from a laser oscillator (not shown) via an optical fiber 5. The laser head 4 radiates the laser beam L focused in the optical system 3 to a portion to be repaired where the crack Wa is generated. In addition, although not shown, the laser welding device 1 includes a drive unit that moves the laser head 4 along the portion to be repaired (along a depth direction in the illustrated example) and close to and away from the portion to be repaired, and a control unit. The control unit controls a welding speed, a laser output, a spot diameter, and the like.

Further, the laser welding device 1 includes a wire feeding mechanism 10. The wire feeding mechanism 10 includes a wire feeding drum 11, and a wire holder 12 for feeding, to a portion to be repaired, a filler wire (filler material) FW which is continuously fed from the wire feeding drum 11.

Note that the wire feeding mechanism 10 may be a hot wire feeding mechanism provided with a wire power supply (not shown). In this case, the filler wire FW can be heated in the vicinity of the portion to be repaired by the wire power supply.

Next, a crack repair method for an existing steel structure according to an embodiment of the present disclosure which is performed by using the thus-configured laser welding device 1 will be described.

The crack repair method for an existing steel structure according to this embodiment is a method for eliminating the crack Wa by melt-repairing using a laser beam L having a low heat input amount. In other words, it is a main feature to suppress the decrease in toughness value of a repair-welding portion while the amount of melting of the structure steel material W is suppressed to a small amount by adopting the laser welding.

Note that the "crack" subject to the crack repair method for an existing steel structure according to the present embodiment is a "through crack" which is represented by a fatigue crack, but it is not limited to this "through crack".

Therefore, prior to the build-up welding step, chemical composition of the structure steel material W of the existing steel structure in which the crack Wa is generated is first investigated. Note that this work may be omitted if the chemical composition of the structure steel material W of the existing steel structure is known.

Next, component of the filler wire FW and additive amount of the filler wire FW are determined according to the toughness value expected for the repair-welding portion after crack repair. With respect to the determination of the component and the additive amount of the filler wire FW, past data stored in a database may be utilized, or data obtained by a test which is performed for each repair may be adopted.

Note that the filler wire FW may be formed of the material of the same type as the structure steel material W which is the base material constituting the existing steel structure, but the filler wire FW is not particularly limited to this material.

Next, in the build-up welding step, a predetermined additive amount of a filler wire FW containing components determined as described above is fed to a portion of the structure steel material W where a crack Wa is generated via the wire holder 12. A laser beam L is irradiated from the laser head 4 to perform build-up welding while the filler wire FW is fed as described above (a state shown in FIG. 1).

In the present embodiment, laser welding is adopted for welding in the build-up welding step, but the present embodiment is not limited to this welding, and arc welding may be adopted.

Figure 2A:
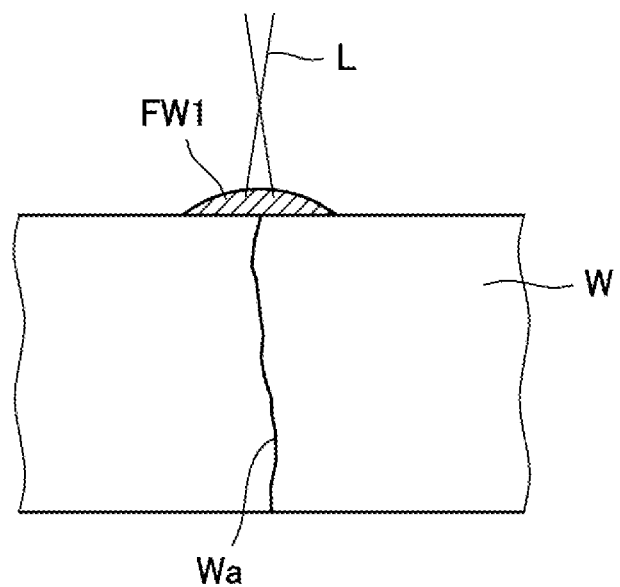
FIG. 2A is a cross-sectional illustrative view showing a laser beam piercing welding step after a build-up welding step in the crack repair method for an existing steel structure according to the embodiment of the present disclosure.
Figure 2B:
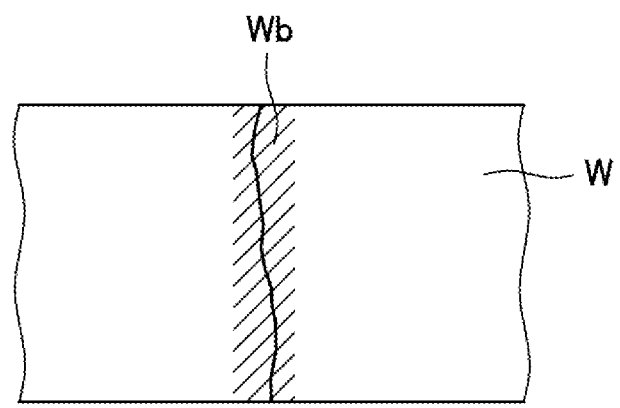
FIG. 2B is a cross-sectional illustrative view after the laser beam piercing welding step in the crack repair method for an existing steel structure according to the embodiment of the present disclosure.

After the build-up welding, as shown in FIG. 2A, a filler material build-up portion FW1 which has been generated by the build-up welding in the previous build-up welding step and the crack Wa are irradiated with a laser beam L from the laser head 4 in the laser beam piercing welding step to perform piercing welding having a low heat input amount. When the piercing welding having a low heat input amount is performed in this way, as shown in FIG. 2B, the crack Wa is repaired without lowering the toughness value by the welding-repaired portion Wb in which the filler material build-up portion FW1 is melted.

In other words, even when the structure steel material W constituting the existing steel structure contains a large amount of carbon, sulfur, and phosphorus, the crack Wa can be eliminated without lowering the toughness value. In other words, the crack Wa can be eliminated without lowering the toughness value even under an operation condition in which a decrease in the toughness value occurs.

In the present embodiment, in the build-up welding step, when build-up welding is performed on the portion of the structure steel material W where the crack Wa is generated, the filler material build-up portion FW1 is formed on a flat surface of the structure steel material W.

Figure 3:
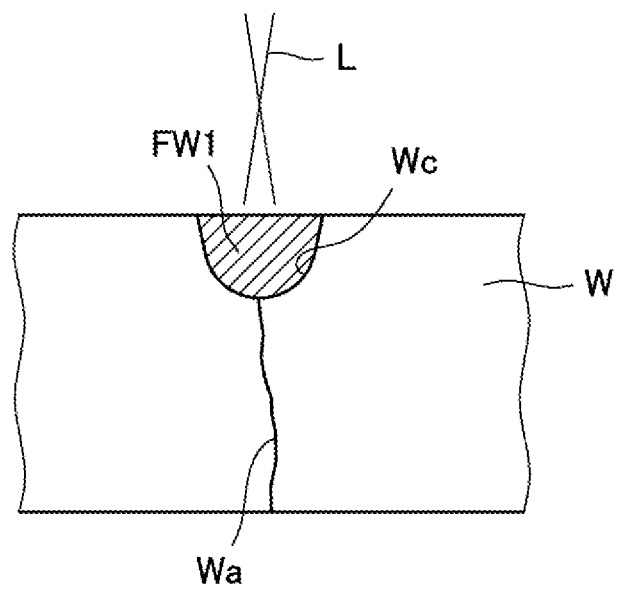
FIG. 3 is a cross-sectional illustrative view showing a laser beam piercing welding step after a build-up welding step in a crack repair method for an existing steel structure according to another embodiment of the present disclosure.

However, when the thickness of the structure steel material W is large or when the additive amount of the filler wire FW is large, build-up welding may be performed as shown in FIG. 3. Specifically, a groove Wc may be formed in the structure steel material W by a tool such as a disc grinder to perform build-up welding on the groove Wc.

In the case of the build-up welding in which the piercing welding using a laser beam L having a low heat input amount is performed on the filler material build-up portion FW1 in the groove Wc formed in the structure steel material W and the crack Wa as described above, the laser output can be reduced by a reduced amount of the bulk of the filler material build-up portion FW1 as compared with the case of the build-up welding in which the filler material build-up portion FW1 is formed on a flat surface.

Therefore, the absorption energy ratio of the welding-repaired portion repaired by the crack repair method of the existing steel structure according to the above-described embodiment to the base material (structure steel material W) (the absorption energy of the welding-repaired portion $(vE_{WM(T=0)})$)/the absorption energy of the base material ($vE_{BM(T=0)}$)) was compared with the absorption energy ratio of Comparative Example. The absorption energy ratio of the Comparative Example is the absorption energy ratio of the welding-repaired portion at which only the piercing welding using a laser beam L is performed without performing the build-up welding added with the filler wire FW to the base material (structure steel material W). By this comparison, a result shown in a graph of FIG. 4 was obtained. The operation condition at this time is shown in the graph of FIG. 4.

Here, as the value of the absorption energy ratio is closer to 1.0, the welding-repaired portion has an absorption energy closer to that of the base material, that is, the toughness value is higher.

Figure 4:
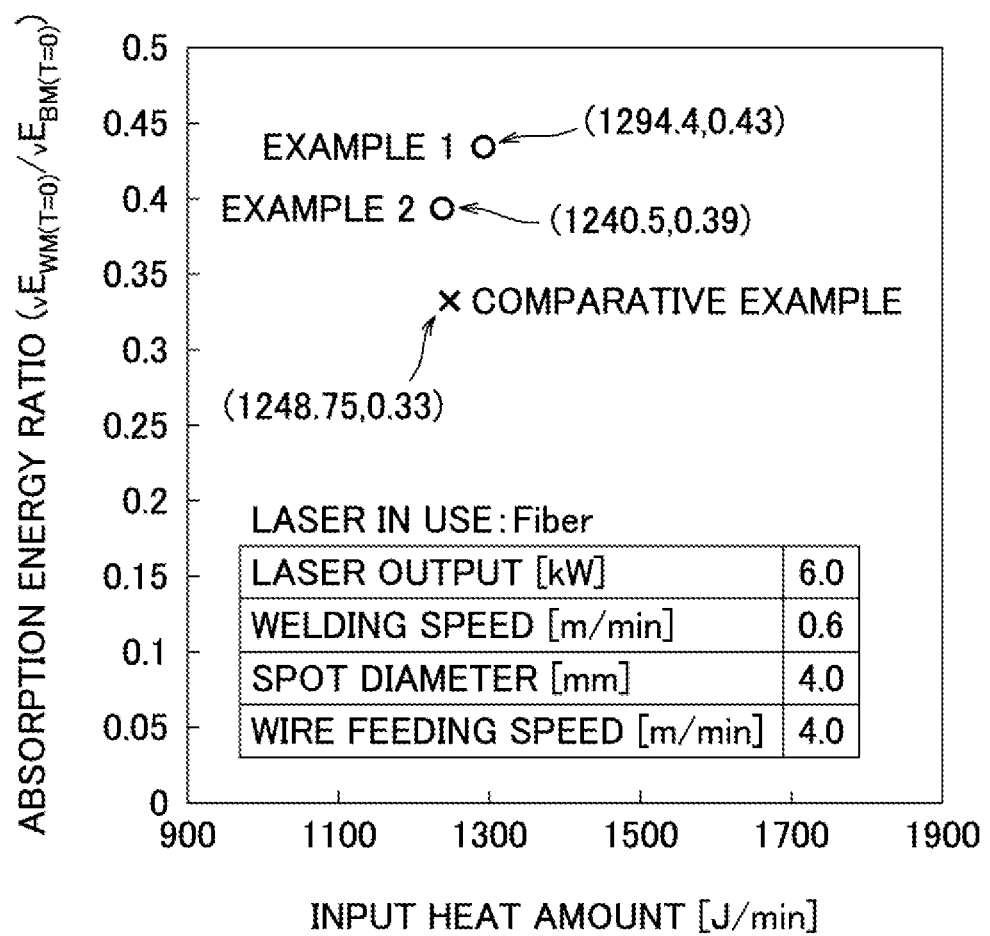
FIG. 4 is a graph illustrating the relation between a heat input amount and an absorbed energy ratio which shows an effect in a welding-repaired portion obtained by the crack repair method for an existing steel structure according to the embodiments of the present disclosure.

In the graph of FIG. 4, the absorption energy ratios of the welding-repaired portions repaired by the crack repair method for the existing steel structure according to the present embodiment (Examples 1 and 2) are indicated by marks of o, and the absorption energy ratio of the welding-repaired portion repaired by only the piercing welding using the laser beam (Comparative Example) is indicated by a mark of x.

As shown in the graph of FIG. 4, it can be seen that each of the welding-repaired portions of Examples 1 and 2 has a higher absorption energy ratio than the welding-repaired portion of Comparative Example although the heat input amount to each welding-repaired portion is substantially equal between Examples 1 and 2 and Comparative Example.

In particular, it can be seen that the welding-repaired portion of Example 1 is larger in absorption energy ratio by 0.1 than the welding-repaired portion of Comparative Example, that is, has a higher toughness value although it has a larger heat input amount than that of Comparative Example.

From these results, it has been demonstrated that the crack repair method for an existing steel structure according to the present embodiment can eliminate a crack generated in the existing steel structure without lowering the toughness value as compared with the conventional repair method in which only piercing welding using a laser beam is performed.

The configuration of the crack repair method for an existing steel structure according to the present disclosure is not limited to the above-described embodiment, and can be variously modified without departing from the spirit of the disclosure.

As another configuration, for example, a configuration of performing piercing welding using a laser beam on a filler material build-up portion and a crack generated in a structural steel material while performing build-up welding using the filler material on the crack may be adopted.

A first aspect of the present disclosure is a crack repair method for repairing a crack generated in an existing steel structure by using a filler material, the crack repair method including a build-up welding step of performing build-up welding using the filler material on the crack generated in the existing steel structure, and a laser beam piercing welding step of performing laser beam piercing welding on a filler material build-up portion caused by the build-up welding in the build-up welding step and the crack.

In the crack repair method for an existing steel structure of the present disclosure, a fiber laser, a YAG laser, or a semiconductor laser is generally used as the laser, but the laser is not limited to these lasers.

In the crack repair method for an existing steel structure of the present disclosure, prior to the build-up welding step, component of the filler material and additive amount of the filler material are first determined according to the toughness value expected for a welding-repaired portion after crack repair. The component and the additive amount of the filler material may be determined by utilizing past data stored in a database, or may be determined by adopting data obtained by tests each of which has been performed every time a repair is performed.

Note that the filler material may be the same type as the structure steel material (base material) constituting the existing steel structure, but it is not particularly limited.

Next, in the build-up welding step, the build-up welding is performed on the crack generated in the existing steel structure while adding the filler material of the component determined as described above by a predetermined addition amount.

In this build-up welding using the filler material, the filler material may be padded on a flat base material surface of the existing steel structure, or may be filled in a groove formed on the base material surface.

The type of welding in the build-up welding step is not particularly limited. In addition to laser welding, arc welding can also be adopted.

A laser output value (kW) when the laser welding is adopted in the build-up welding step is determined so as to enable laser beam piercing welding to be performed, and in order to perform the laser beam piercing welding, the laser output density is to be at least 1 (kW/mm$^2$).

Further, when the arc welding is adopted in the build-up welding step, the heat input amount (the amount of heat to be given to a welded portion from the outside during the arc welding; J/cm) determined according to 60 (constant)×current×voltage/speed is determined so that the thermal effect on welding metal and its surroundings can be suppressed to a small extent.

After the build-up welding, in the laser beam piercing welding step, piercing welding having a low heat input amount is performed on the filler material build-up portion caused by the build-up welding in the previous build-up welding step and the crack by a laser beam. By performing the piercing welding having a low heat input as described above, the crack can be melted and eliminated without lowering the toughness value even when the structure steel material constituting the existing steel structure contains a large amount of carbon, sulfur, and phosphorus.

In other words, it is possible to eliminate a crack without lowering the toughness value even under an operation condition that may cause a decrease in toughness value, such as repairing a crack in an existing steel structure formed of an old structure steel material.

A second aspect of the present disclosure is such that the build-up welding in the build-up welding step is performed on a groove formed in the existing steel structure.

In the case of the build-up welding in which the build-up welding in the build-up welding step is performed on the groove formed in the existing steel structure as described above, as compared with the case of the build-up welding in which the filler material build-up portion is formed on a flat surface, the laser output can be reduced by a reduced amount of the bulk of the filler material build-up portion.

EXPLANATION OF REFERENCE SIGNS

FW filler wire (filler material)
FW1 filler material build-up portion
L laser beam
M structure steel material constituting existing steel structure
Wa crack
Wc groove

The invention claimed is:

1. A crack repair method for an existing steel structure that repairs a crack generated in the existing steel structure by using a filler material, the crack repair method comprising:
   a build-up welding step of performing build-up welding by arc welding or laser welding using the filler material on the crack generated in the existing steel structure to form a filler material build-up portion; and
   a laser beam piercing welding step of performing piercing welding by irradiating the filler material build-up portion with a laser beam such that a welding-repaired portion, in which the filler material build-up portion is melted, is formed around the crack.

2. The crack repair method for the existing steel structure according to claim 1, wherein the build-up welding in the build-up welding step is performed on a groove formed in the existing steel structure by a tool.

* * * * *